United States Patent
Li

(10) Patent No.: US 7,103,465 B2
(45) Date of Patent: Sep. 5, 2006

(54) VEHICLE MANUAL BRAKE AUXILIARY SYSTEM

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 177 days.

(21) Appl. No.: 10/945,601

(22) Filed: Sep. 20, 2004

(65) Prior Publication Data

US 2006/0064224 A1    Mar. 23, 2006

(51) Int. Cl.
*G06F 19/00* (2006.01)
(52) U.S. Cl. .................. 701/70; 701/36; 303/121; 188/110
(58) Field of Classification Search ............ 701/1, 701/36, 70; 303/121; 188/79.57, 79.58, 188/110, 357, 359, 360
See application file for complete search history.

(56) References Cited

U.S. PATENT DOCUMENTS 3,593,815 A * 7/1971 Inoue ..................... 180/271
6,086,515 A * 7/2000 Buschmann et al. ........ 477/194
6,193,332 B1 * 2/2001 Ono ........................... 303/191
6,315,372 B1 * 11/2001 Kroger et al. .............. 303/191
6,702,405 B1 * 3/2004 Balz et al. .................. 303/192
7,011,377 B1 * 3/2006 Ehrmaier et al. ............. 303/16
2002/0023809 A1 * 2/2002 Ehrmaier et al. ........... 188/110
2006/0063643 A1 * 3/2006 Li ............................... 477/190

* cited by examiner

Primary Examiner—Gary Chin
(74) Attorney, Agent, or Firm—Dellett & Walters

(57) ABSTRACT

An auxiliary system for a manual brake in a vehicle includes a controlling unit to receive and analyze signals indicating current vehicle status and whether a driver is away from the vehicle so as to initiate necessary actions, a pressure sensor adapted for a driver's seat to sense pressure from the driver and then send a signal to the controlling unit to determine whether the driver is at the driver's seat, a speed interface to communicate an input of the controlling unit with an onboard vehicle speed sensor (VSS) to allow the controlling unit to acquire a speed signal as a reference for determination of whether the car is in movement and a server mechanism to mechanically control the brake system via a motor under control of the controlling unit.

6 Claims, 5 Drawing Sheets

VEHICLE MANUAL BRAKE AUXILIARY SYSTEM

BACKGROUND OF THE INVENTION

1. Field of the Invention

The present invention relates to a vehicle manual brake auxiliary system, and more particularly to a vehicle manual brake auxiliary system to automatically stop movement of the vehicle when the driver is not at the driver's seat and the manual brake is not engaged.

2. Description of Related Art

Automobiles regardless of stick-shift gear change type or the automatic type are introduced to the world to bring fast paced lifestyle and convenience to the people. Distance seems not to be a problem between two persons far away from each other because of the convenient transportation opportunities we now have.

However, despite all the conveniences we have in our lives due to the introduction of cars, there is still something which is not so convenient to the user (the driver). That is, whenever the car is stopped, the driver has to apply the manual brake before leaving the car, otherwise, the car will move due to the slope of the road. If the driver forgets to apply the manual brake, the car might be damaged or even endanger a passersby. This kind of danger originates from the total dependence to the driver's concern to safety and the danger arising from a driver's forgetfulness is not addressed.

To overcome the shortcomings, the present invention tends to provide an improved auxiliary braking system to mitigate the aforementioned problems.

SUMMARY OF THE INVENTION

The primary objective of the present invention is to provide an improved vehicle manual brake auxiliary system to automatically stop the vehicle from movement when the driver is not in the driver's seat.

In order to accomplish the foregoing objective, the system of the present invention includes the following elements:

a controlling unit to receive and analyze signals indicating the current car status and whether the driver is away from the car so as to initiate necessary actions;

a pressure sensor received in the driver's seat to sense the pressure from the driver and then send a signal to the controlling unit to determine whether the driver is at the driver's seat;

a speed interface to communicate an input of the controlling unit with a vehicle speed sensor (VSS) to allow the controlling unit to acquire a speed signal as a reference for determination of whether the car is in movement; and a server mechanism to mechanically control the braking system via a motor under the control of the controlling unit, whereby when the car is detected to be motionless, the driver is also detected to be away from the driver's seat and the manual braking lever is not engaged by the driver, the server mechanism under the command of the controlling unit will then initiate the motor to engage the braking system to secure the car to as to accomplish the purpose of stopping the movement of the car and prevention of accidents.

A further advantage of the invention is that the controlling unit has a pushbutton operably connected to the controlling unit to allow the driver to manually engage/disengage the braking system.

Another advantage of the present invention is that the controlling unit further monitors whether the braking pedal is engaged and whether the ignition system is off so as to engage the braking system under the circumstances that the braking pedal is engaged and the vehicle ignition system is off.

Still, a further advantage of the present invention is that the auxiliary system further has an indicator operably connected to an output of the controlling unit to send either visually or acoustically a signal to the driver.

Other objects, advantages and novel features of the invention will become more apparent from the following detailed description when taken in conjunction with the accompanying drawings.

BRIEF DESCRIPTION OF THE DRAWINGS

FIG. 3 is a circuit diagram of the auxiliary system of the present invention, wherein FIG. 3 is divided into three sub-diagrams, FIGS. 3A, 3B and 3C.

DETAILED DESCRIPTION OF THE PREFERRED EMBODIMENT

Figure 1:
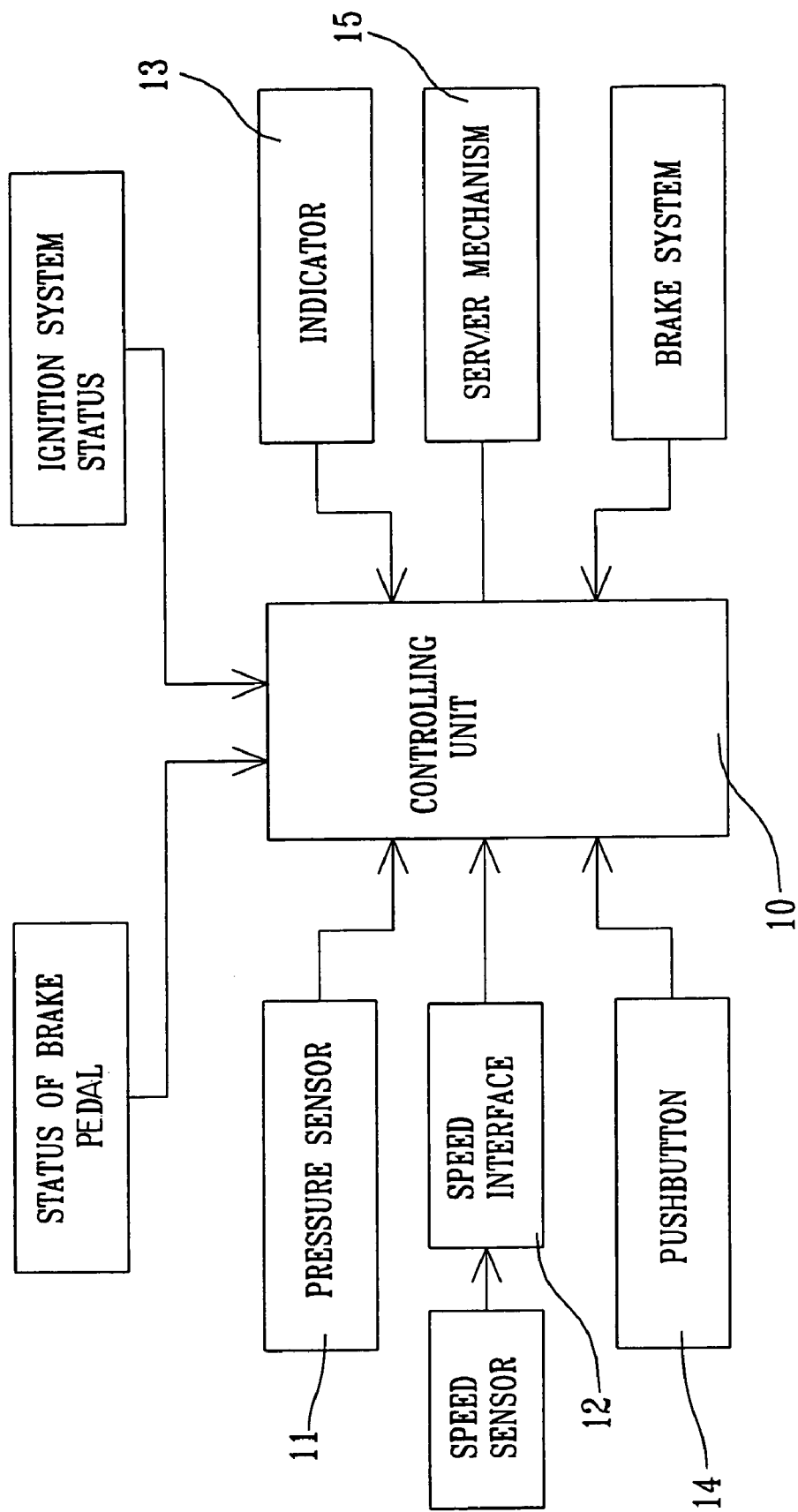
FIG. 1 is a block diagram of the auxiliary system of the present invention.
Figure 2:
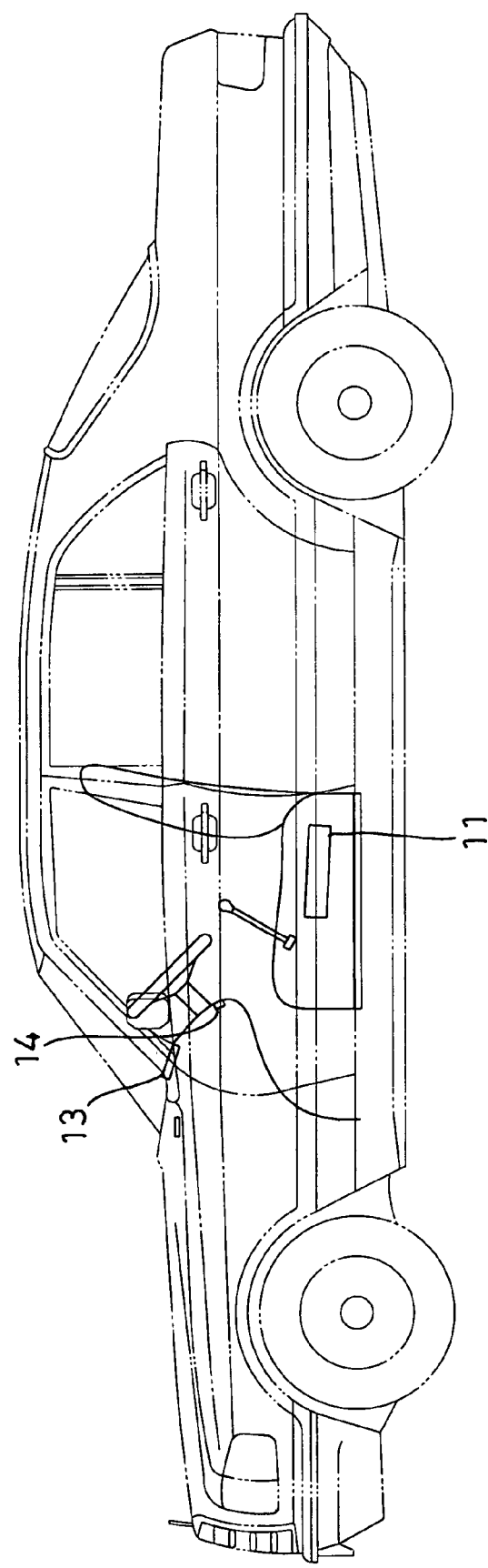
FIG. 2 is a schematic view showing the possible locations inside a vehicle to mount the auxiliary system of the present invention.
Figure 3A:
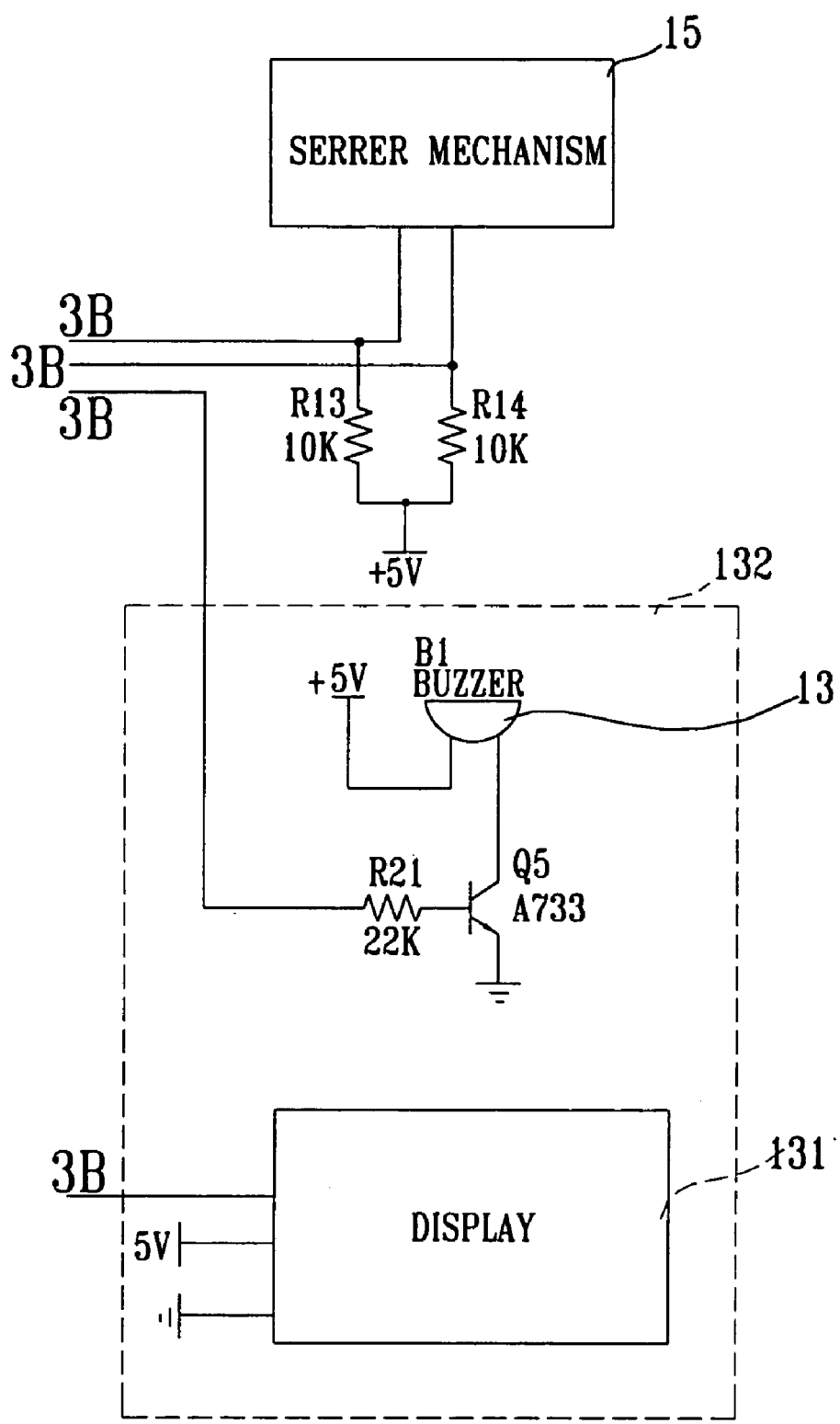
Figure 3B:
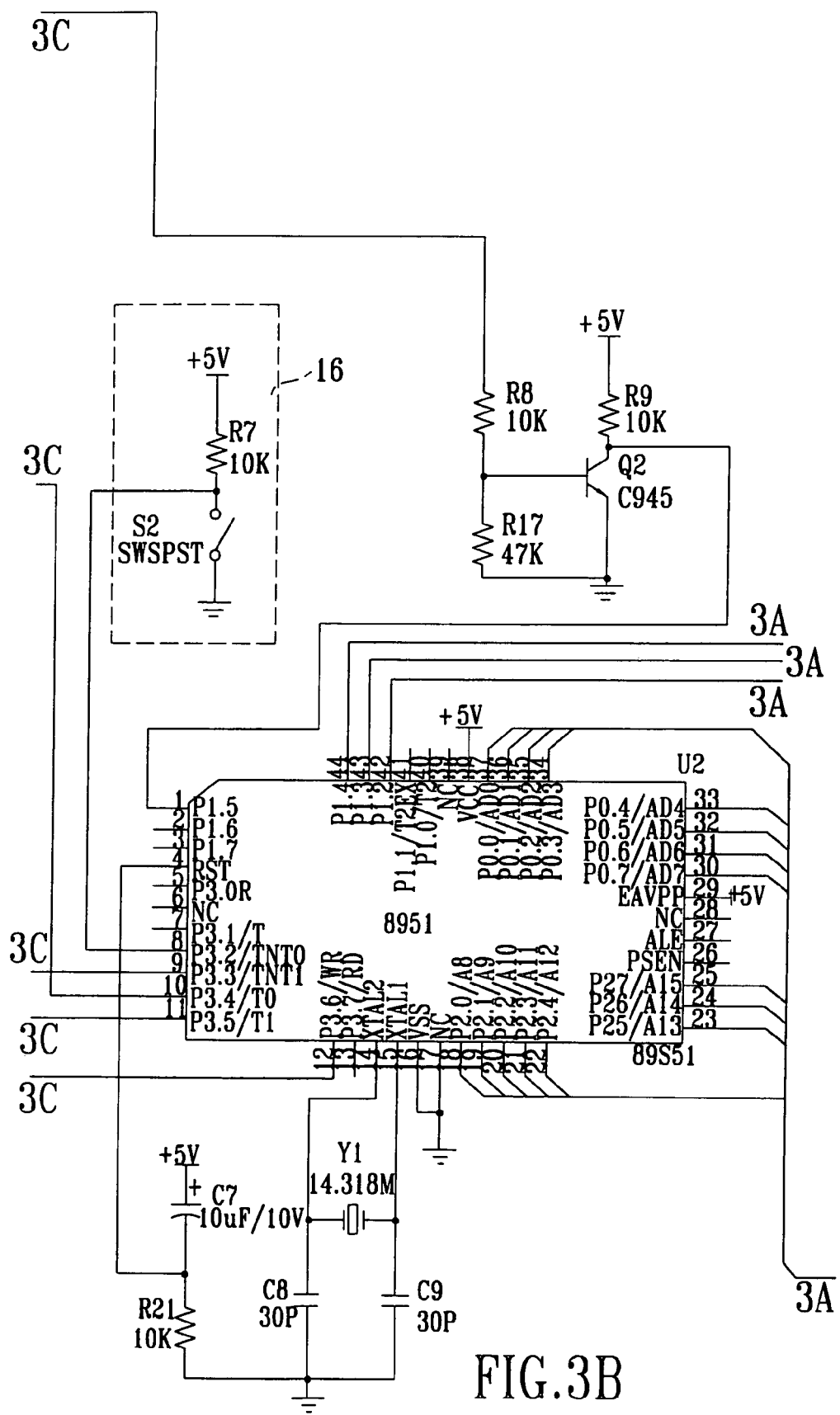
Figure 3C:
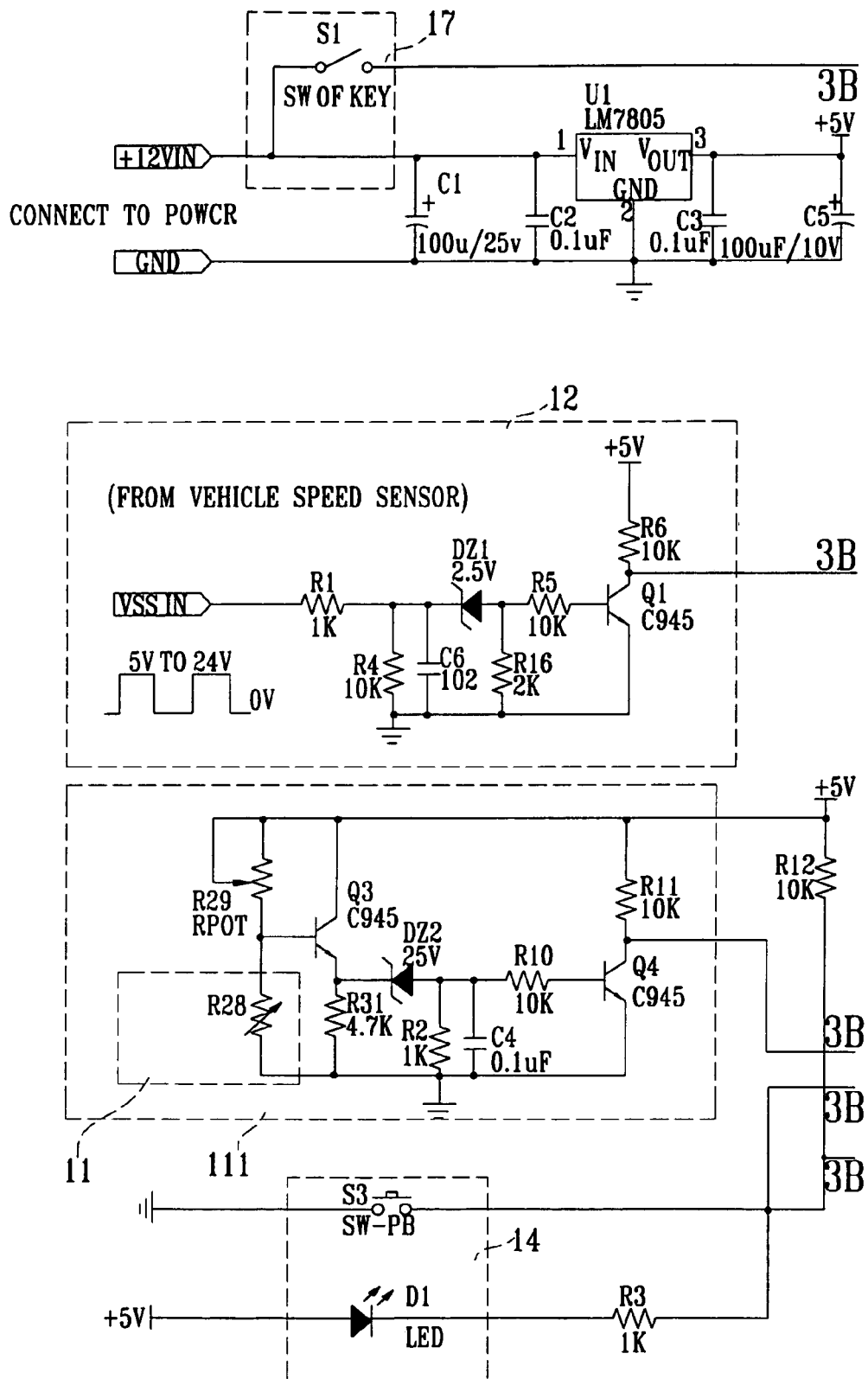

With reference to FIG. 1, the vehicle manual brake auxiliary system in accordance with the present invention includes:

a controlling unit (10) to receive and analyze signals such as the current car status and whether the driver is away from the car so as to initiate necessary actions;

a pressure sensor (11) received in the driver's seat (as shown in FIG. 2) to sense the pressure from weight of the driver and then send a signal to the controlling unit (10) to determine whether the driver is at the driver's seat;

a speed interface (12) to communicate an input of the controlling unit (10) with a vehicle speed sensor (VSS) to allow the controlling unit (10) to acquire a speed signal as a reference for determination of whether the car is in movement;

an indicator (13) operably connected to an output of the controlling unit (10) to provide a visual or acoustic signal showing the current vehicle status to the driver;

a pushbutton (14) operably connected to an input of the controlling unit (10) to allow the driver to selectively engage/disengage the brake system; and a server mechanism (15) to mechanically control the brake system via a motor under the control of the controlling unit (10). When the car is detected to be motionless, the driver is also detected to be away from the driver's seat and the manual braking lever is not engaged by the driver, the server mechanism (15) under the command of the controlling unit (10) will then initiate the motor to engage the brake system to secure the car to as to accomplish the purpose of stopping the movement of the car and prevention of accidents.

The controlling unit (10) is able to receive and analyze the information about whether the driver is at the driver's seat and whether the vehicle ignition system is ON or OFF as a reference for determination of the vehicle current status.

With reference to FIG. 3 and FIGS. 3A, 313 and 3C, the controlling unit (10) is composed of a microprocessor (8951). Inputs of the controlling unit (10) respectively connect to the speed interface (12), the indicator (13), the pushbutton (14) and the server mechanism (15).

The pressure sensor (12) is connected to the controlling unit (10) via a connection interface circuit (111). An input of the speed interface (12) is connected to the vehicle's VSS and an output of the speed interface (12) is connected to the controlling unit (10). The indicator (13) is composed of a display (131) and a buzzer (132) respectively connected to the output of the controlling unit (10) so that the driver is reminded by either visual or acoustic signals or the combination thereof of the current vehicle status.

Two inputs of the controlling unit (10) are respectively connected to two switches (16,17) to sense whether the brake lights of the vehicle are ON to determine whether the brake pedal is engaged and whether the ignition system is ON. The server mechanism (15) is connected to the vehicle's onboard brake system which in turn is able to send a signal to the controlling unit (10) to indicate the current status when the onboard brake system is already engaged.

According to the aforementioned description, it is said that when the VSS signal is detected by the controlling unit (10) to be zero (0), the vehicle is motionless, and the pressure sensed by the pressure sensor (14) is also zero (0), the driver has left the driver's seat, the controlling unit (10) will send a signal to engage the onboard brake system via the server mechanism (15) to ensure that the vehicle is not movable when the onboard brake system is not engaged.

Furthermore, when the driver is still sitting on the driver's seat (the pressure sensor (14) senses a pressure), the brake lights are ON (the brake pedal is stepped down to engage the onboard brake system) and the ignition system is OFF, the controlling unit (10) may still be able to engage the onboard brake system via the server mechanism (15) to prevent movement of the vehicle. Meanwhile, the display (131) or the buzzer (132) of the indicator (13) is able to send out a picture or a warning alarm to remind the driver of the engagement of the onboard brake system.

If the vehicle is detected to be motionless and the brake pedal is stepped down, the auxiliary system of the present invention is in a standby status. In the meantime, the controlling unit (10) continues to monitor the status of the pushbutton (14). If the pushbutton (14) is pressed, the auxiliary system switches from one mode to the other mode. For example, if the auxiliary system is already engaged before the pushbutton (14) is pressed, the downward movement of the pushbutton (14) will disengage the locking mode of the onboard brake system to the vehicle. However, if the auxiliary system is not engaged before the pushbutton (14) is pressed, the downward movement of the pushbutton (14) will initiate the controlling unit (10) to enter a monitoring mode and the indicator (13) to indicate the current status of the auxiliary system.

Still, if the vehicle is already in motionless status and the auxiliary system is engaged, if the pushbutton (14) is pressed more than a predetermined time period (e.g. 10 seconds), the auxiliary system will automatically disengage the onboard brake system no matter what the current vehicle situation is and the indicator (13) will display the disengagement status of the auxiliary system, which applies only when there is a malfunction in the vehicle and the driver is at the driver's seat.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auxiliary system for a manual brake in a vehicle, the auxiliary system comprising:
   a controlling unit to receive and analyze signals indicating current vehicle status and whether a driver is away from the vehicle so as to initiate necessary actions;
   a pressure sensor adapted for a driver's seat to sense pressure from the driver and then send a signal to the controlling unit to determine whether the driver is at the driver's seat;
   a speed interface to communicate an input of the controlling unit with an onboard vehicle speed sensor (VSS) to allow the controlling unit to acquire a speed signal as a reference for determination of whether the car is in movement; and
   a server mechanism to mechanically control the manual brake via a motor under control of the controlling unit,
   whereby when the vehicle is detected to be motionless, the driver is also detected to be away from the driver's seat and the manual brake is not engaged by the driver, the server mechanism under command of the controlling unit will then initiate the motor to engage the manual brake to secure the car as to accomplish the purpose of stopping movement of the car and prevention of accidents.

2. The auxiliary system as claimed in claim 1, wherein the controlling unit further receives signals indicating whether a brake pedal is engaged and whether an ignition system is ON.

3. The auxiliary system as claimed in claim 2, wherein the controlling unit further receives signals indicating whether a brake light is lit for determination of whether the brake pedal is engaged.

4. The auxiliary system as claimed in claim 2 further comprising a pushbutton operably connected to the controlling unit to selectively engage/disengage motion of the motor.

5. The auxiliary system as claimed in claim 4 further comprising an indicator operably connected to the controlling unit for indicating the current vehicle status acoustically or visually.

6. The auxiliary system as claimed in claim 5, wherein the indicator is composed of a display and a buzzer.

* * * * *